United States Patent [19]
Kuhnert

[11] 3,846,904
[45] Nov. 12, 1974

[54] MACHINING CENTER WITH A STORAGE DRUM ROTATABLE ABOUT A HORIZONTAL AXIS

[75] Inventor: Hans Kuhnert, Wiesloch, Germany

[73] Assignee: Heidelberger Druckmaschinen AG, Heidelberg, Germany

[22] Filed: Jan. 20, 1972

[21] Appl. No.: 219,318

[30] Foreign Application Priority Data
Jan. 21, 1971 Germany............................ 2102860

[52] U.S. Cl. ................................................ 29/568
[51] Int. Cl. .......................................... B23q 3/157
[58] Field of Search ...................... 29/568, 26 A, 40

[56] References Cited
UNITED STATES PATENTS

| | | | |
|---|---|---|---|
| 2,682,698 | 7/1954 | Berthiez | 29/40 |
| 2,956,454 | 10/1960 | Hansen | 29/568 X |
| 3,134,276 | 5/1964 | Abrams | 29/40 X |
| 3,238,615 | 3/1966 | Leone et al. | 29/568 |
| 3,546,774 | 12/1970 | Stöfferle et al. | 29/568 |

FOREIGN PATENTS OR APPLICATIONS
1,477,429   1/1970   Germany .............................. 29/568

*Primary Examiner*—Andrew R. Juhasz
*Assistant Examiner*—Z. R. Bilinsky
*Attorney, Agent, or Firm*—Herbert L. Lerner

[57] ABSTRACT

Machining center including a cross feed table, at least one tool drum mounted on the cross feed table, the tool drum being rotatable about a horizontal axis and displaceable in the direction of the axis. A plurality of spindle sleeves are mounted in the tool drum parallel to the axis at mutually spaced locations along at least one circle coaxial in respect to the periphery of the tool drum. At least one machining tool is disposed in each of the spindle sleeves, the tool drum being turnable about the horizontal axis to positions at which the tools are respectively at a given elevation so as to be in operating position for machining a workpiece. The center further includes a head stock which carries the tool drum provided on the cross slide table which is movable in the direction of the workpiece and above which there is provided a tool storage unit, a tool changing arrangement being disposed between the tool storage unit and the tool drum.

5 Claims, 3 Drawing Figures

MACHINING CENTER WITH A STORAGE DRUM ROTATABLE ABOUT A HORIZONTAL AXIS

The invention relates to a machining center with a tool drum rotatable about a horizontal axis in which there are disposed, symmetrically about the circumference, spindle sleeves each carrying a respective associated tool displaceable parallel to the rotational axis of the tool drum, and which, through rotation of the tool drum about the horizontal axis, are conveyed into the working position. One or more tool drums are disposed on a cross slide table, rotatable about a horizontal axis and transposable in the axial direction, the spindle sleeves of which are distributed about one or more graduated circles carrying a single or a multiple tool. The height adjustment of each of the single or multiple tools, transposed into the working position, may be obtained by means of rotation of the tool drum about the horizontal axis, as disclosed in German Patent Application P 20 38 842.5.

Such machining centers have several advantages in respect to those known from the prior art. Thus, for instance, merely by the swinging motion of the tool drum, the tool change, as well as the vertical positioning of the tool with respect to the working piece, may be attained. Furthermore, each stored tool may be brought into action at any desired point of the tool drum circumference. The working range of the machining center is thereby substantially enlarged along the longitudinal axis. Should it be desirable to work on such a machine with heavy tools in high stiffness spindle sleeves, such a large space requirement becomes necessary for individual spindles that a representative drum size is no longer capable of accommodating a sufficient number of tools in a single or double drum.

It is an object of the invention, in spite of the use of spindle sleeves of high stiffness with correspondingly great space requirements, to provide the possibility of storing a sufficiently large number of tools.

The solution, in accordance with the invention, is such that a head stock for supporting the tool drum is provided on the cross slide table which is displaceable in the direction of the workpiece. A tool storage unit is disposed above the head stock, and a tool changing arrangement is placed between the tool storage unit and the tool drum.

The tool storage unit and tool changer may be secured to the head stock, the tool storage unit being rotatable about an axis which is positioned vertically with respect to the rotational axis of the tool drum.

The invention makes it possible that, even when using rigid spindle sleeves, storage is attained for a number of tools sufficient for all machining centers without a decrease in the advantages of the tool drum as initially described.

In order to simplify the control of a machining center in a further embodiment in accordance with the invention, four spindle sleeves have been arranged symmetrically in the tool drum in a graduated circle which may be rotated into one of several fixed altitude adjustments, the console carrying the workpiece being adjustable in a vertical direction.

With such an arrangement of the control of the storage unit, all operational movements are made linearly, which simplifies the programming greatly. Moreover, the vertical adjustability of the console provides an enlargement of the working range also in respect to the vertical axis.

With these and other objects in view, which will become apparent in the following detailed description, the present invention will be clearly understood in connection with the accompanying drawings, in which.

Figure 1:
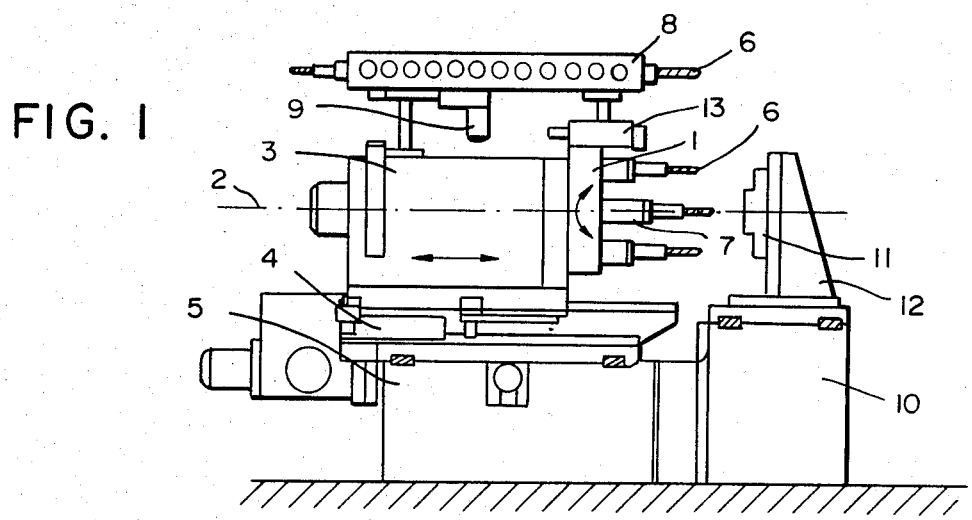
FIG. 1 is a view in elevation of a machining center in accordance with the invention.

The machining center according to FIG. 1 includes a swinging drum 1 which is rotatable about the horizontal axis 2 and supported by a head stock 3. The head stock 3 is arranged on a cross slide 4 displaceable in the direction of the axis 2. The cross slide 4 is itself placed on a machine pedestal 5 and is movable crosswise with respect to the axis 2.

Several spindle sleeves 7 are arranged symmetrically in a graduated circle in the tool drum 1, arranged to carry a single or a group tool 6, the sleeves being displaceable in an axial direction. A tool magazine 8 supported by a head stock 3 is disposed above the rotating drum 1. For the purpose of selecting a required tool 6, a motor 9 turns the tool magazine 8 about a vertical axis. Should the required tool be disposed above the tool drum 1, a changer arrangement 13, which is provided between the tool magazine 8 and the tool drum 1, may exchange the ready made tool 6 against the tool in the next following spindle sleeve 7. For the purpose of the exchange of the tool 6, each of the spindle sleeves 7 is required to take up the predetermined change position.

A workingpiece conveyor 10 passes the tool drum 1, upon which one or more work tables 12 carrying workingpieces 11 may be moved into working position and may there be stopped.

Should, for instance, four spindle sleeves 7 be provided in the tool drum 1, all four tools 6 carried by the spindle sleeve 7 may one after another be brought into service on the readymade workpiece 11. Only thereafter, the exchange of the used tools 6 against others which have been made ready in the tool magazine 8 may take place through a tool exchange arrangement 13, a new working cycle being initiated thereby.

Figure 2:
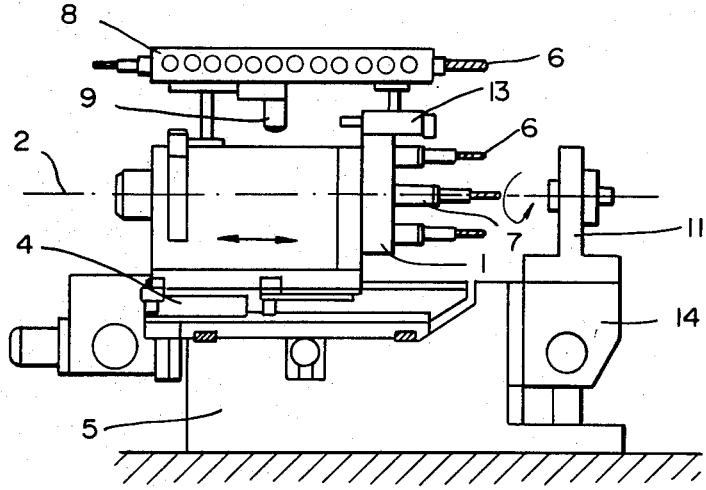
FIG. 2 is a view in elevation of another machining center in accordance with the invention, with an altitude-adjustable console.

The machining center shown in FIG. 2 differs from the one of FIG. 1 only by a simplified control of the tool drum 1 and a different support of the workpiece 11. Instead of the workpiece conveyor 10 having work tables 12 arranged for displacement thereon, only a vertically adjustable console 14 for carrying the workpiece 11 is provided.

The control of the rotating drum is such that each of the four spindle sleeves 7 may be rotated into four or eight fixed or graduated positions.

The adjustment in altitude of the tool which is to be positioned here, takes place, on the one hand, through the rotational movement of the rotating drum and, on the other hand, through the vertical adjustment of the working piece 11 with the aid of console 14. The vertical movement of the console 14 is necessary only to the extent that the next following spindle sleeve position of the rotating drum 1 deviates from the predetermined working position of the workpiece 11.

Figure 3:
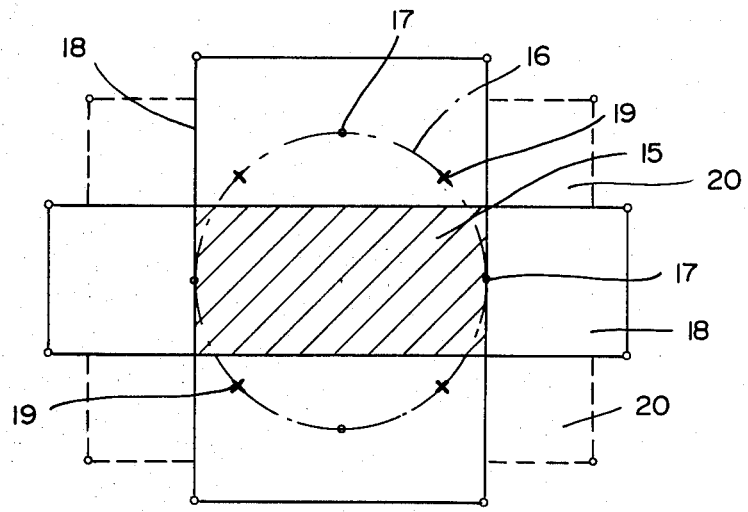
FIG. 3 is a schematic view of the working range of a machining center in accordance with FIG. 2.

FIG. 3 illustrates the working range of a machining center in accordance with FIG. 2. A spindle sleeve, which is provided in the rotating axis of the rotating drum 1, merely due to the longitudinal movement of the cross slide 4, as well as due to the vertical movement of the console 14, covers a working range in accordance with the cross-hatched surface 15. The situation is such, however, that the spindle sleeves 7 are disposed on the graduated circle 16 and may, for instance, be rotated into four fixed graduated positions, which are indicated by circles 17. The working range, which may be covered by all four of the tools disposed in the rotating drum, corresponds to the surface enclosed by the full line 18. Should further fixed graduate positions of the rotating drum 1, as indicated by crosses 19, that is in all eight graduate positions, be provided, the working range will be increased by four surfaces, as shown by the surfaces 20 bilaterally enclosed by dot-dashed lines.

The additional, vertical displacement of the workpiece 11 thus results in a considerable enlargement of the working range of a rotating drum machine. Moreover, the simplified control, in accordance with the arrangement of the fixed graduate positions of the rotating drum, provides advantages in respect to manual programming since all of the operating movements are made linearly.

While I have disclosed several embodiments of the present invention, it is to be understood that these embodiments are given by example only and not in a limiting sense, the scope of the present invention being determined by the objects and the claims.

It is claimed:

1. Machining center comprising at least one tool drum rotatable about a substantially horizontal axis, said tool drum bein displaceable in the direction of said axis, said tool drum having one side through which said axis passes facing a workpiece with said side movable along said axis toward and away from said workpiece, a plurality of spindle sleeves disposed substantially parallel to said axis for accommodating respectively associated tools disposed on said one side of said drum facing toward said workpiece, said spindle sleeves disposed on said one side through which said axis passes being placeable into respective working positions with change of height by rotation of said drum about its axis, a cross slide at an elevation below said tool drum, a head stock on said cross slide for supporting said rotatable tool drum, said head stock being disposed on said cross slide for slidable displacement thereon toward a workpiece, a tool storage unit disposed adjacent said head stock, and a tool exchanging arrangement disposed between said tool storage unit and said tool drum whereby said tool exchanging arrangement will remove a tool from a spindle sleeve in said tool drum and replace it with another tool from said tool storage unit.

2. Machining center comprising at least one tool drum rotatable about a substantially horizontal axis, said tool drum having one side through which said axis passes facing a workpiece with said side movable along said axis toward and away from said workpiece, a plurality of spindle sleeves disposed substantially parallel to said axis for accommodating respectively associated tools disposed on said one side of said drum facing toward said workpiece, said spindle sleeves disposed on said one side through which said axis passes being placeable into respective working positions with change of height by rotation of said drum about its axis, said spindle sleeves being displaceable in a direction parallel to said axis of rotation, said tool drum being displaceable in the direction of said axis, a cross slide at an elevation below said tool drum, a head stock on said cross slide for supporting said rotatable tool drum, said head stock being disposed on said cross slide for slidable displacement thereon toward a workpiece, a tool storage unit disposed adjacent said head stock, and a tool exchanging arrangement disposed between said tool storage unit and said tool drum whereby said tool exchanging arrangement will remove a tool from a spindle sleeve in said tool drum and replace it with another tool from said tool storage unit.

3. A machining center according to claim 2, wherein said tool storage unit and said tool exchanging arrangement are secured to said head stock, said tool storage unit being rotatable about an axis at right angle to said first named axis.

4. A machining center according to claim 2, wherein said spindle sleeves are disposed on said tool drum in a graduate circle coaxial with respect to said axis of rotation.

5. A machining center according to claim 4, wherein there are four spindle sleeves symmetrically distributed on said tool drum in a graduate circle, each being pivotable into one of several fixed elevational positions; further including a console for holding a workpiece adjustable in a vertical sense relative to said axis of rotation in conjunction with a respective tool in one of said spindle sleeves.

* * * * *